(12) United States Patent
Liberman et al.

(10) Patent No.: US 11,280,658 B2
(45) Date of Patent: Mar. 22, 2022

(54) RADAR LEVEL GAUGE FOR MEASURING THE VOLUME OF BULK PRODUCTS IN TANKS

(71) Applicant: Joint Stock Company "Limaco", Tula (RU)

(72) Inventors: Aleksandr Vladimirovich Liberman, Tula (RU); Andrei Valerievich Tarnovskii, Tulskaya obl. (RU); Gennadii Gennadievich Lichkov, Tula (RU)

(73) Assignee: Joint Stock Company "LIMACO", Tula (RU)

( * ) Notice: Subject to any disclaimer, the term of this patent is extended or adjusted under 35 U.S.C. 154(b) by 179 days.

(21) Appl. No.: 16/620,811

(22) PCT Filed: May 24, 2018

(86) PCT No.: PCT/RU2018/050056
§ 371 (c)(1),
(2) Date: Dec. 9, 2019

(87) PCT Pub. No.: WO2018/226126
PCT Pub. Date: Dec. 13, 2018

(65) Prior Publication Data
US 2021/0140811 A1   May 13, 2021

(30) Foreign Application Priority Data
Jun. 8, 2017 (RU) .......................... RU2017120253

(51) Int. Cl.
*G01F 23/284* (2006.01)
*G01S 13/34* (2006.01)
(Continued)

(52) U.S. Cl.
CPC .......... *G01F 23/284* (2013.01); *G01S 13/343* (2013.01); *G01S 13/424* (2013.01); *G01S 13/88* (2013.01); *H01Q 1/225* (2013.01)

(58) Field of Classification Search
CPC ...... G01S 13/88; G01S 13/343; G01S 13/424; G01F 23/284; H01Q 1/225
See application file for complete search history.

(56) References Cited

U.S. PATENT DOCUMENTS

| 4,219,814 A | * | 8/1980 | Johnson | ................... G01S 13/89 342/105 |
| 5,614,831 A | | 3/1997 | Edvardsson | |

(Continued)

FOREIGN PATENT DOCUMENTS

| RU | 2397453 | 8/2010 |
| RU | 2575185 | 7/2014 |
| RU | 2561309 | 8/2015 |

OTHER PUBLICATIONS

D.K. Barton and S.A. Leonov, Radar Technology Encyclopedia, Artech House (ISBN 0-89006-893-3), pp. 11 and 332, copyright 1998; 4 pgs.

(Continued)

*Primary Examiner* — Marcus E Windrich
(74) *Attorney, Agent, or Firm* — Faegre Drinker Biddle & Reath LLP

(57) ABSTRACT

Radar level gauge for measuring the volume of bulk products in tanks comprises a level sensor, a primary antenna, a microwave module, a software module, an interface converter and a control unit, and further comprises at least two supplementary antennas with microwave modules; two switches that are structurally joined with the primary antenna and the microwave module into a multichannel transceiver module (TRM) having a signal output connected to the level sensor, and a monitoring output connected to (Continued)

input of the control unit, a control input and a channel number selection input of the multichannel TRM being connected to respective outputs of the control unit.

7 Claims, 3 Drawing Sheets

(51) Int. Cl.
    *G01S 13/42*     (2006.01)
    *G01S 13/88*     (2006.01)
    *H01Q 1/22*     (2006.01)

(56) References Cited

U.S. PATENT DOCUMENTS

| | | | | |
|---|---|---|---|---|
| 5,990,828 | A * | 11/1999 | King | E05F 15/77 |
| | | | | 341/176 |
| 6,606,904 | B2 * | 8/2003 | Muller | G01F 23/284 |
| | | | | 324/639 |
| 7,924,217 | B2 * | 4/2011 | Jirskog | G01S 13/34 |
| | | | | 342/124 |
| 2003/0146867 | A1 * | 8/2003 | Kornle | G01F 23/284 |
| | | | | 342/124 |
| 2005/0179584 | A1 * | 8/2005 | Ohlsson | G01S 7/023 |
| | | | | 342/124 |
| 2006/0005621 | A1 | 1/2006 | Lenk | |
| 2008/0062037 | A1 * | 3/2008 | Edvardsson | G01F 23/284 |
| | | | | 342/124 |
| 2009/0295618 | A1 * | 12/2009 | Beeri | G01S 13/89 |
| | | | | 342/22 |
| 2013/0269414 | A1 * | 10/2013 | Ferraro | G01F 23/2962 |
| | | | | 73/1.73 |
| 2014/0208845 | A1 * | 7/2014 | Zlotnick | G01F 23/296 |
| | | | | 73/290 V |
| 2014/0340259 | A1 * | 11/2014 | Fehrenbach | G01S 13/88 |
| | | | | 342/359 |
| 2016/0097669 | A1 * | 4/2016 | Backstrom | G01F 23/296 |
| | | | | 342/124 |
| 2019/0145909 | A1 * | 5/2019 | Georgeson | G01N 22/02 |
| | | | | 342/22 |
| 2020/0193589 | A1 * | 6/2020 | Peshlov | G06K 9/00657 |
| 2021/0236744 | A1 * | 8/2021 | Murray | A61M 5/3134 |

OTHER PUBLICATIONS

International Search Report and Written Opinion for PCT/RU2018/050056, dated Sep. 6, 2018 6 pages (includes English translation of International Search Report).

* cited by examiner

RADAR LEVEL GAUGE FOR MEASURING THE VOLUME OF BULK PRODUCTS IN TANKS

CROSS REFERENCE TO RELATED APPLICATIONS

This application is a U.S. national phase application under 35 U.S.C. § 371 of International Application No. PCT/RU2018059956, filed May 24, 2018, which claims priority to Russian Patent Application No. 201720253 filed Jun. 8, 2017 the disclosure of which are expressly incorporated herein in their entirety.

TECHNICAL FIELD

The present invention relates to the monitoring and measurement of the volume of bulk products in tanks and can be used in chemical, mining, construction industries and at the enterprises where tanks filled with bulk materials are used.

BACKGROUND OF THE INVENTION

Patent RU 2575185 C2 (published Jan. 27, 2014) discloses a method for measuring the level of bulk materials in tanks and a radar level gauge for implementing the method. Antenna of the radar level gauge comprises a printed microstrip antenna with electrical scanning of the radiation pattern in the interior of the tank. The antenna is fixed in the required position, relative to which the radiation pattern is controlled by phase steering of the probing signal excited by different sets of radiating elements. The disadvantage of this method of controlling the antenna pattern is that the antenna gain decreases with increasing the angle of deviation of the radiation pattern relative to the normal to the plane in which the radiating elements are arranged. This phenomenon may lead to a complete loss of the reflected signal when a number of adverse factors coincide, e.g. the need to work with a large deviation angle of the radiation pattern (low-height large-diameter tanks) and the use of a low reflectivity product such as cement or dry grain.

The prior art most closely related to the invention is a contactless radar level gauge comprising a level sensor with a separate transceiver antenna in combination with its orienting apparatus based on a mechanical drive mounted on a connecting flange (see e.g. US 2013/0269414 A1, published Oct. 17, 2013).

A sensor of the radar level gauge together with the orienting apparatus is mounted on the tank roof. The sensor is mounted by bolting a flange of the orienting apparatus on the mating flange of the tank pipe. Thus, the flange of the orienting apparatus is rigidly connected to the pipe flange. An independent transceiver antenna of the radar level gauge is accommodated in the tank interior and coupled to the sensor via the orienting apparatus. The angle of the antenna inside the tank is varied remotely using a mechanical drive of the orienting apparatus. The need for measurements at different inclination angles of the antenna is due to the specific shape of the surface of bulk mass inside the tank. The actual level of the bulk material can vary significantly at different points on the surface, especially at the points of loading and discharging. Therefore, to increase the accuracy of measurements of the product volume in the tank, level measurements are to be taken at different points on the surface.

The mechanical method of varying the antenna inclination angle in the tank interior suffers significant problems when measurements are taken in tanks with bulk products. In the conditions of high dust content inherent in the tanks with bulk products, the presence of a mechanical drive substantially reduces the reliability of the orienting apparatus and the accuracy of setting the antenna to the required position.

Measurements taken by the radar method on the surface of bulk materials have their own specifics as compared to liquid products. This is associated with the fact that the surface of bulk product is uneven and in some cases may have an irregular structure, therefore, there is no mirror reflection of the signal emitted by the antenna, and sometimes the signal can be partially or completely lost. In this case, a variation in the antenna position can contribute to the appearance of useful signal. It should also be noted that mechanical drive units working in dusty environment require regular maintenance, thereby increasing operating expenses of the radar level gauge as a whole.

SUMMARY OF THE INVENTION

The object of the present invention is to provide a radar level gauge for measuring the volume of bulk products in tanks, which would ensure higher reliability and accuracy of measurements of the volume of a product in the tank without requiring the operating personnel to perform maintenance during operation.

The object is attained by a radar level gauge comprising a level sensor, a primary antenna, a microwave module, a software module, an interface converter and a control unit, and further comprising at least two supplementary antennas with microwave modules; two switches that are structurally joined with the primary antenna and the microwave module into a multichannel transceiver module (TRM) having a signal output connected to the level sensor, and a monitoring output connected to input of the control unit, a control input and a channel number selection input of the multichannel TRM being connected to respective outputs of the control unit.

Preferably, the multichannel transceiver module (TRM) comprises five antennas, five microwave modules and two switches.

Preferably, all the antennas are enclosed in the multichannel TRM housing, and radiating side of the antennas is oriented to the surface being studied.

Preferably, the supplementary antennas are equidistant from the center of the TRM and spaced apart at the same distance over the circumference.

Preferably, all the antennas form a set of microstrip radiators and a focusing lens is mounted under each of the microstrip radiators.

Preferably, the supplementary antennas are mounted at a certain fixed angle with respect to the tank walls, and position of the radiation pattern of the primary antenna disposed in the center is directed parallel to the tank walls.

Preferably, the microwave modules are disposed above the focusing lenses at a fixed distance from them.

Preferably, the microwave module and the focusing lens form an integral structure.

Preferably, the microwave module is made in the form of a printed circuit board embodying circuitry of the module and the set of microstrip radiators, which form, together with the focusing lens, an antenna.

Preferably, the switches are accommodated in the housing of the five-channel TRM and mounted on a separate printed circuit board.

The multichannel TRM enables quick variation, without mechanical means, of the radiation pattern position of the radar level gauge inside the volume being studied in accordance with a specified algorithm, thereby providing the advantages such as improved performance of the instrument owing to increased reliability and accuracy of measurements of the volume of bulk materials in tanks, without requiring maintenance from the operating personnel during operation.

BRIEF DESCRIPTION OF THE DRAWINGS

The invention is further explained in the description of the preferred embodiment with reference to the accompanying drawings, in which.

DESCRIPTION OF PREFERRED EMBODIMENT

Figure 1:
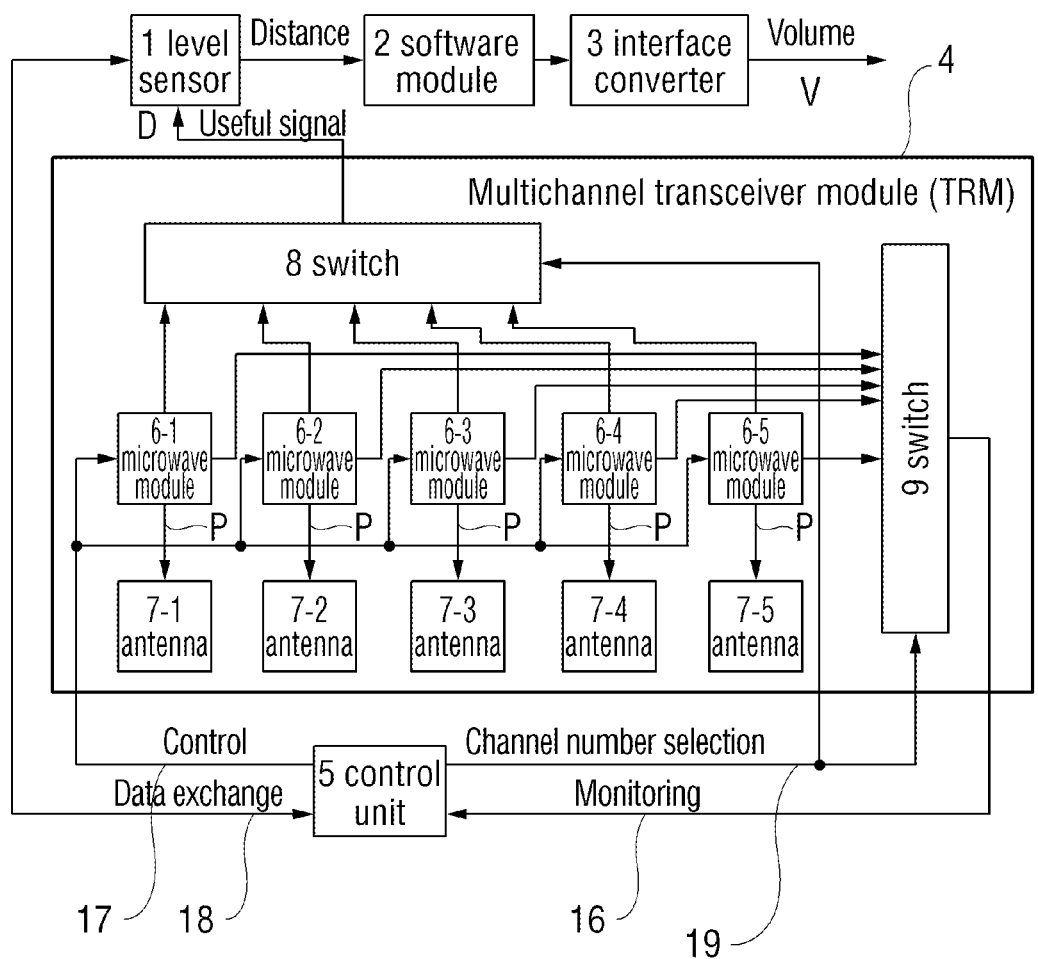
FIG. 1 is a structural diagram of a radar level gauge with a multichannel TRM having five channels in the depicted embodiment.

A radar level gauge for measuring the volume of bulk products in tanks comprises a level sensor 1 (FIG. 1), a software module 2 coupled to the sensor 1, an interface converter 3 connected to output of the software module 2. A multichannel transceiver module (TRM) 4 and a control unit 5 are connected to the level sensor 1.

Figure 2:
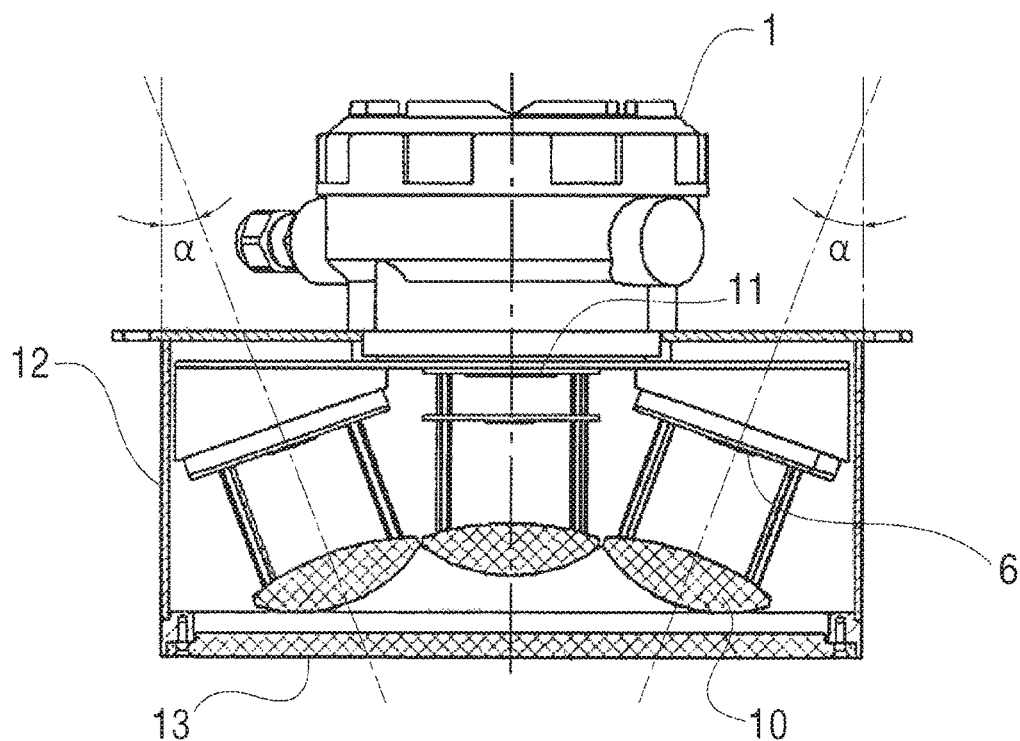
FIG. 2 is an external side view of a multichannel TRM having five channels.

The multichannel TRM 4 comprises five microwave modules 6-1, 6-2, 6-3, 6-4, 6-5, five antennas 7-1, 7-2, 7-3, 7-4, 7-5 connected to respective microwave modules 6, and two switches 8 and 9. Each microwave module 6 comprises a printed circuit board made of a layered microwave material. A set of microstrip radiators is arranged on the external side of the printed circuit board facing a focusing lens 10 (FIG. 2) and forms, together with the focusing lens 10, an antenna 7. Two switches 8 and 9 are disposed on a printed circuit board 11 accommodated in the multichannel TRM 4.

Figure 3:
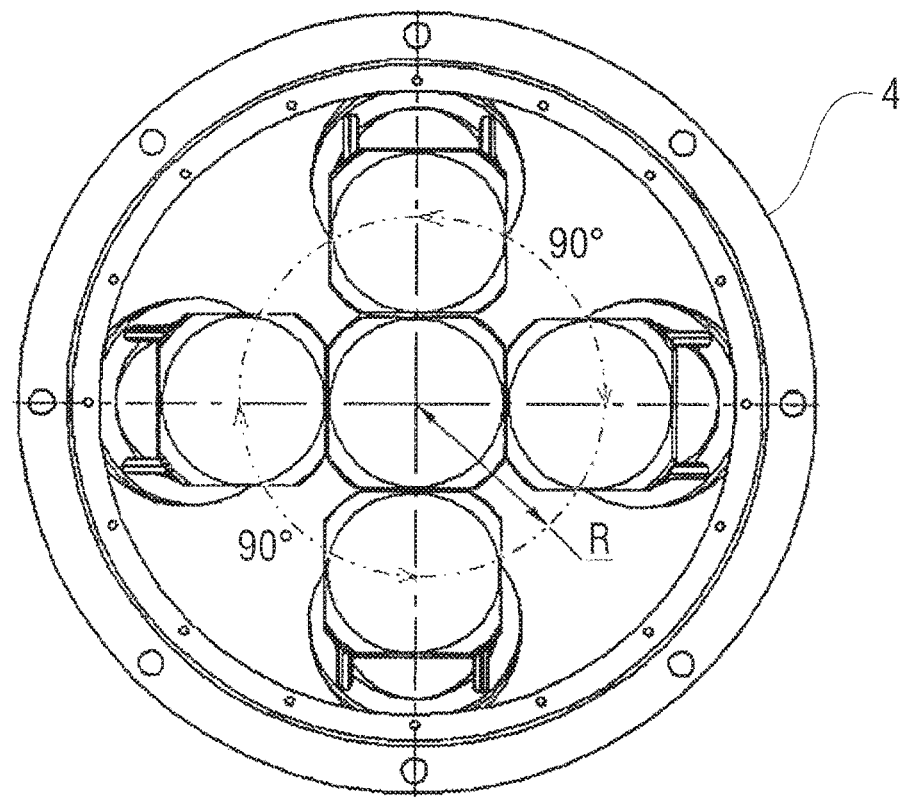
FIG. 3 is an external bottom view of a multichannel TRM having five channels.

The multichannel TRM 4 is enclosed in a metal housing in the form of an open-side cylinder 12 that has a protective screen 13 in the form of a round plate made of radio-transparent material. Supplementary antennas are disposed at distance R (FIG. 3) from the center of the TRM 4 and spaced apart at the same distance over the circumference at an angle of 90° and additionally at an angle a (FIG. 4) with respect to a tank wall 14.

The angle a determines the position of the radiation pattern of four supplementary antennas 7-2, 7-3, 7-4, 7-5 relative to the tank 14 wall and is calculated based on the geometric data of the particular tank.

The radar level gauge operates in the following manner. The level sensor 1 mounted on the roof of the tank 14 generates, in cooperation with the control unit 5 and the multichannel TRM 4, a probing signal that is emitted alternately by one of five antennas 7-1, 7-2, 7-3, 7-4, 7-5 in the direction of the surface of the bulk material 15. Signal reflected from the surface of the bulk material 15 returns to the level sensor 1. Frequency of the probing signal is varied in linear fashion over a specified period of time. Probing signal is a frequency modulation of continuous wave (FMCW) signal. Interaction of the probing and reflected signal in one of mixers of the microwave modules 6-1, 6-2, 6-3, 6-4, 6-5 produces a distance signal D whose frequency carries information about the distance to the surface of the bulk material 15 and depends on frequency deviation and duration and propagation speed of the probing signal. The mixer is a standard unit of the microwave module.

The method for determining the distance with the FMCW (frequency modulation of continuous wave) signal is not the subject of the invention, it is described in detail in numerous sources e.g. in electronic edition of Radar Technology Encyclopedia by D. K. Barton and S. A. Leonov, Artech House (ISBN 0-89006-893-3), pp. 11, 332, and on the applicant's website www.limaco.ru.

After appropriate processing of the distance signal D in the level sensor 1, the calculated distance value is sent to the software module 2, where the volume of the bulk material 15 is determined based on the entered physical parameters of the reservoir 14. The calculated volume V of the bulk material 15 is transmitted via the interface converter 3 to a computer, controller, etc. for further processing and rendering. The interface converter 3 is designed to couple a standard port, e.g. USB, RS-232, of a device receiving data from the radar level gauge with RS-485 interface of the level sensor 1. For example, the interface converter 3 can be UPort 1150I converter manufactured by Moxa (www.moxa.com).

Position of the radiation pattern of the multichannel TRM 4 is varied by alternately turning on one of five channels: microwave module 6-1, 6-2, 6-3, 6-4, 6-5—antenna 7-1, 7-2, 7-3, 7-4, 7-5. Channel number is selected by appropriate command sent to the switches 8 and 9 from the control unit 5. The switch 8 is used to select distance signal D of the desired channel, and the switch 9 is used to select respective monitoring channel to supply to the control unit 5 a signal whose frequency is proportionally related to the current frequency of the probing signal P of the particular microwave module 6. Monitoring circuit 16, control circuit 17 and data exchange bus 18 are designed to generate probing signal P with linearly varied frequency. Frequency of the probing signal P generated in each channel is controlled through a control circuit 19 that connects the control unit 5 to all the microwave modules 6-1, 6-2, 6-3, 6-4, 6-5 at the same time.

Figure 4:
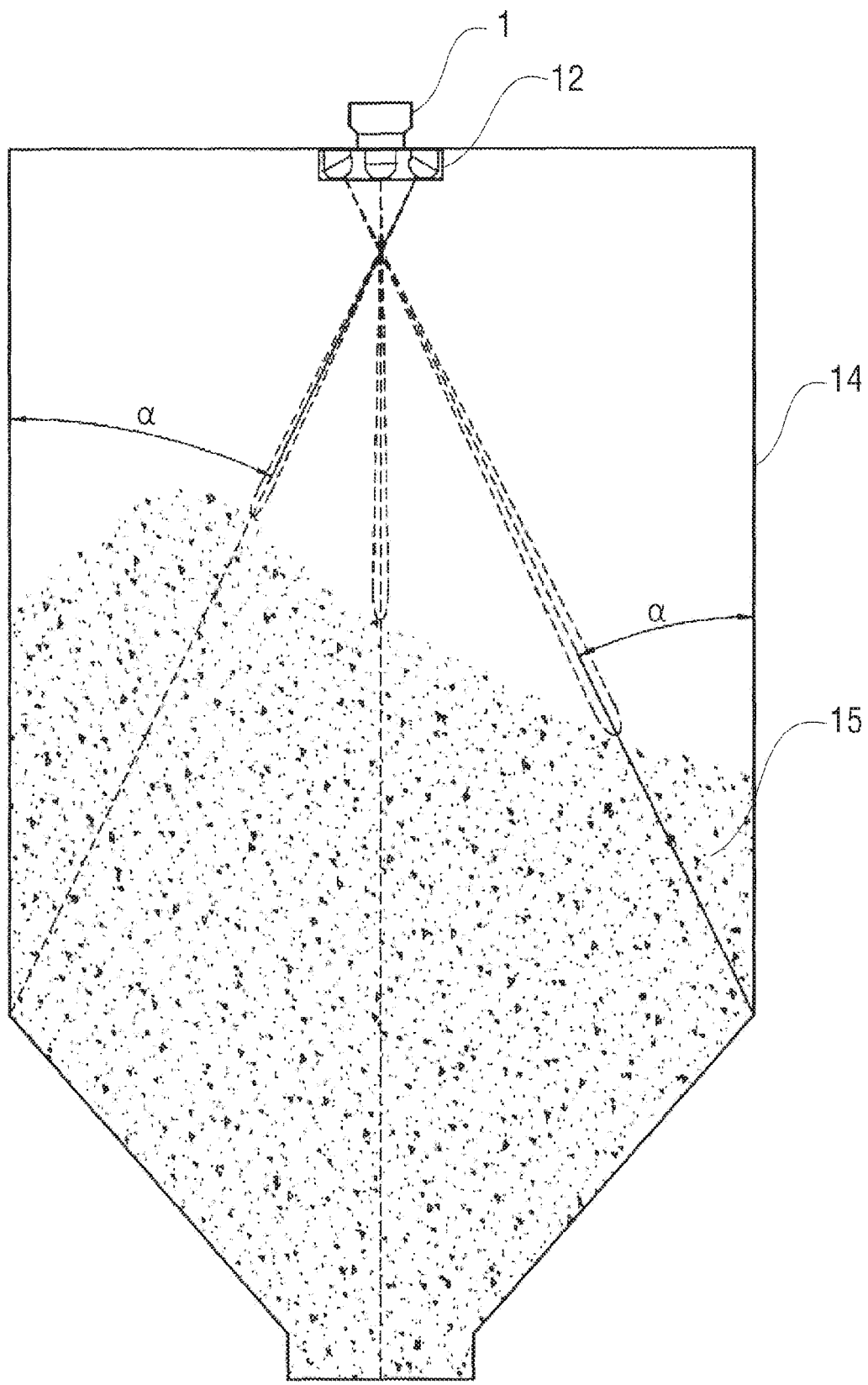
FIG. 4 is an external view of a tank with a level sensor mounted therein.

The above structure of the multichannel TRM 4 determines the fixed number, equal to five, of angular positions of radiation patterns of antennas 7-2, 7-3, 7-4, 7-5 in the interior of the tank 14. Radiation pattern of the primary (central) antenna 7-1 is parallel to walls of the tank 14. Radiation patterns of the other four supplementary antennas 7-2, 7-3, 7-4, 7-5 are directed at fixed angle α, whose value is determined by the geometric dimensions and shape of the tank 14, e.g. diameter, coordinates of the line of transition of cylindrical part of the tank into a conical (FIG. 4).

The algorithm for determining the volume of bulk materials based on level measurements at five different points ensures more reliable data compared with the conventional single-channel method. The use of an operating frequency of about 130 GHz enables designing a small-size transceiver module 4 with a narrow radiation pattern of antennas 7. In light of this and also due to the absence of any mechanically movable parts, the volume of bulk products in tanks can be accurately and reliably measured even in dusty conditions.

Calculations and experiments led to the conclusion that increasing the number of supplementary antennas over four would complicate the hardware of the level gauge, increase its size and cost, but without any significant affect on its technical characteristics, i.e. without enhancing the achieved technical effect. On the other hand, decreasing the number of supplementary antennas significantly impairs the reliability of measurements of the volume of bulk products in tanks, i.e. the embodiment with four antennas supplementary to a single primary antenna is optimal in terms of the achieved technical effect/radar level gauge cost ratio.

INDUSTRIAL APPLICABILITY

The present radar level gauge for measuring the volume of bulk products in tanks can be used in chemical, mining, construction industries and at the enterprises operating with tanks that are filled with bulk materials. Tests of the level gauge have confirmed its efficiency and advantages over the existing level gauges.

The invention claimed is:
1. A radar level gauge for measuring volume of bulk products in a tank, comprising:
   a level sensor mounted on a roof of the tank;
   a primary antenna mounted inside the tank along a tank axis and equipped with a microwave module;
   at least two supplementary antennas mounted inside the tank next to the primary antenna at an angle α with respect to walls of the tank, each of the at least two supplementary antennas being equipped with a microwave module;
   a software module located in a level sensor housing;
   an interface converter located in the level sensor housing and connected to the software module;
   a control unit located in the level sensor housing, the control unit having control outputs, a control input and a data exchange input connected to the level sensor; and
   two switches, the two switches together with the primary antenna, the at least two supplementary antennas and the corresponding microwave modules are structurally combined into a multichannel transceiver module (TRM);
   wherein:
      the TRM has a signal output, the signal output being an output of one of the two switches and connected to the level sensor;
      the TRM has a control output, control output being an output of the other one of the two switches and connected to the control input of the control unit;
      the TRM has a control input connected to inputs of the corresponding microwave modules;
      the TRM has a channel number selection input connected to the two switches;
      each of the primary antenna and the at least two supplementary antennas is formed as a set of microstrip radiators;
      a group of focusing lenses is disposed under the corresponding microwave modules, each focusing lens being disposed under the set of microstrip radiators at a fixed distance from the corresponding microwave modules;
      the primary antenna and the at least two supplementary antennas are enclosed in a housing of the TRM; and
      radiating sides of the primary antenna and the at least two supplementary antennas are oriented toward a surface being studied.

2. The radar level gauge according to claim 1, wherein the TRM comprises five antennas, five corresponding microwave modules and the two switches.

3. The radar level gauge according to claim 1, characterized in that wherein the at least two supplementary antennas are equidistant from a center of the TRM and spaced apart at the same distance over the circumference.

4. The radar level gauge according to claim 1, wherein the at least two supplementary antennas are mounted at a certain fixed angle with respect to the walls of the tank, and radiation of the primary antenna disposed in the center is directly parallel to the walls of the tank.

5. The radar level gauge according to claim 1, wherein the corresponding microwave modules and the group of focusing lenses form an integral structure.

6. The radar level gauge according to claim 1, wherein:
   each of the corresponding microwave modules is made from a printed circuit board embodying circuitry of the corresponding microwave module; and
   the set of microstrip radiators together with the group of focusing lenses form an antenna.

7. The radar level gauge according to claim 1, wherein the two switches are accommodated in the housing of the TRM and mounted on a separate printed circuit board.

* * * * *